Sept. 21, 1954

A. J. GRANBERG 2,689,550

LIQUID METER

Filed May 26, 1952

INVENTOR.
ALBERT J. GRANBERG
BY
Bruce & Brosler
HIS ATTORNEYS

Sept. 21, 1954     A. J. GRANBERG     2,689,550
LIQUID METER
Filed May 26, 1952     3 Sheets-Sheet 2
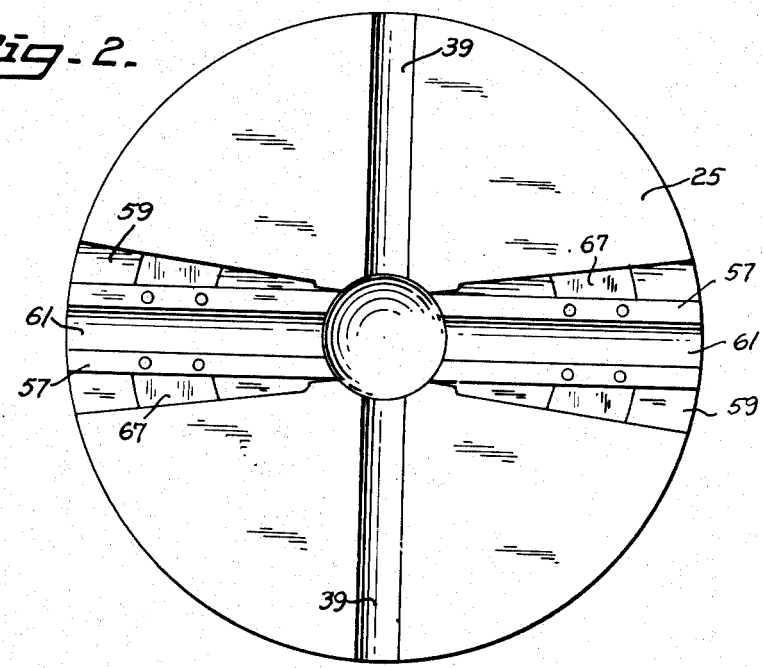
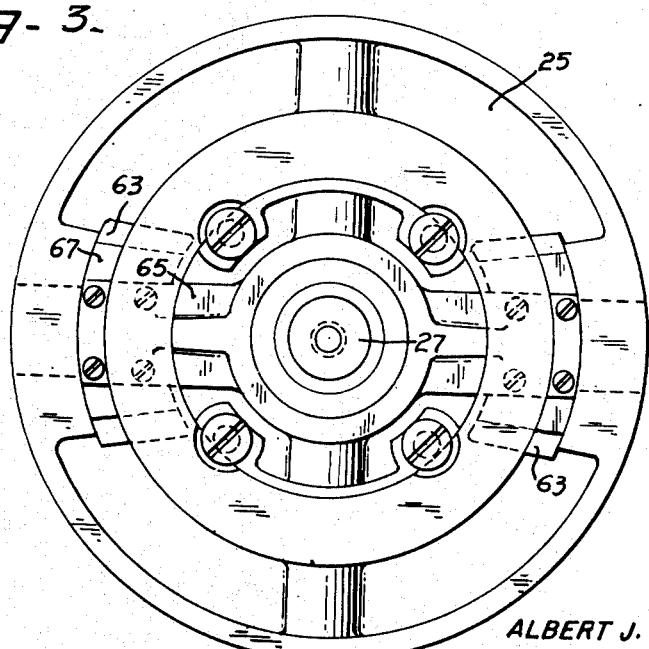
INVENTOR.
ALBERT J. GRANBERG
BY
*Bruce & Brosler*
HIS ATTORNEYS Sept. 21, 1954     A. J. GRANBERG     2,689,550
LIQUID METER Filed May 26, 1952                         3 Sheets-Sheet 3

INVENTOR.
ALBERT J. GRANBERG
BY
    Bruce & Brosler
HIS ATTORNEYS

Patented Sept. 21, 1954

2,689,550

UNITED STATES PATENT OFFICE 2,689,550

LIQUID METER

Albert J. Granberg, Oakland, Calif., assignor to Granberg Corporation, Oakland, Calif., a corporation of California Application May 26, 1952, Serial No. 290,067

5 Claims. (Cl. 121—69)

My invention relates to liquid meters, and more particularly to liquid meters of the positive displacement type, and is an improvement on the meter of my earlier Patent No. 2,292,631 of August 11, 1942.

Among the objects of my invention are:

(1) To provide a novel and improved liquid meter;

(2) To provide a novel and improved liquid meter of the positive displacement type;

(3) To provide a novel and improved liquid meter of the positive displacement type which will function with increased efficiency over a longer life span.

Additional objects of my invention will be brought out in the following description of a preferred embodiment of the same taken in conjunction with the accompanying drawings wherein—

Figure 2 is a top plan view of a base plate assembly of said meter.

Figure 3 is a bottom plan view of the base plate assembly of Figure 2.

Figure 1:
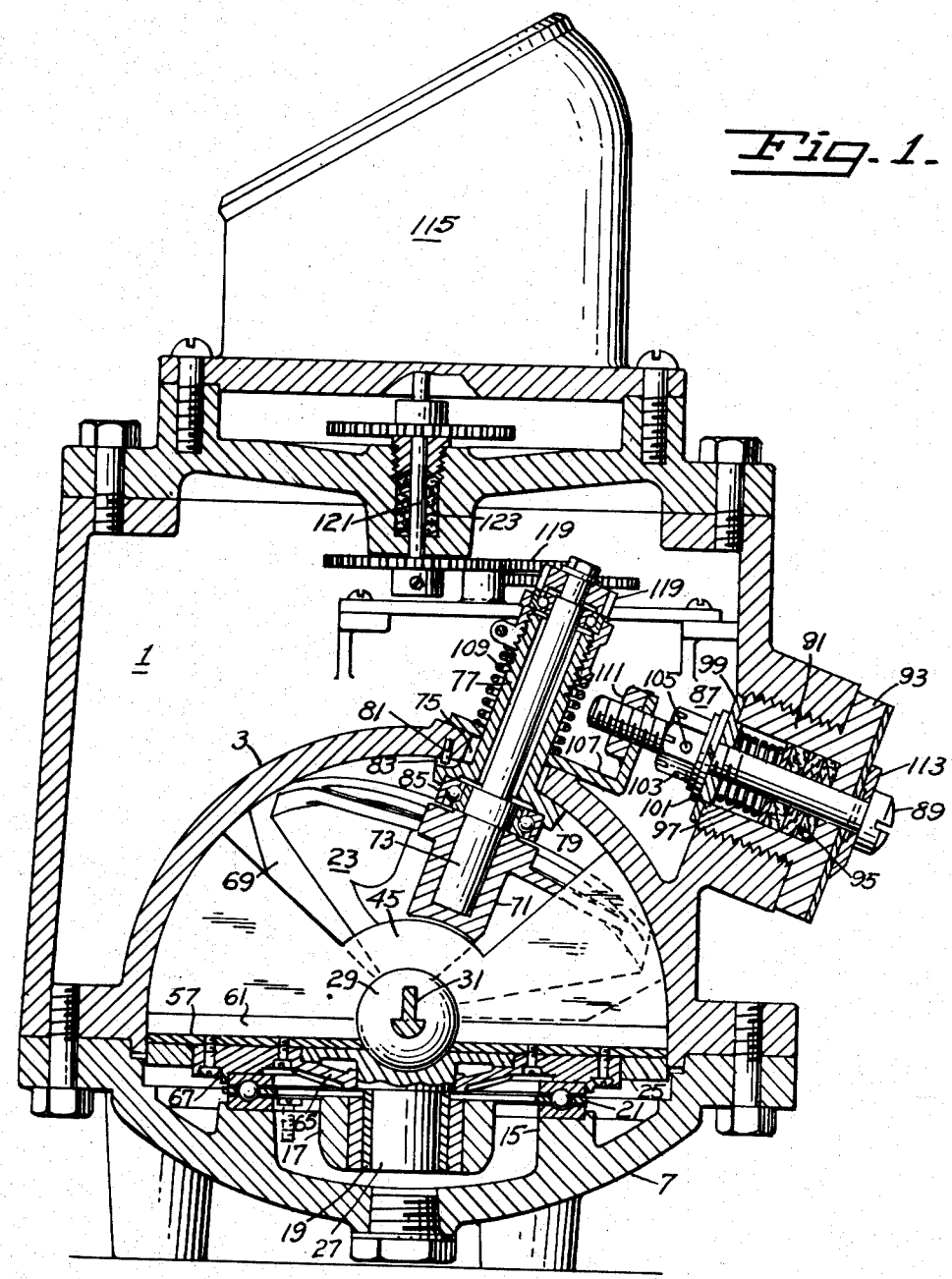
Figure 1 is an elevational view in section of my improved meter.
Figure 4:
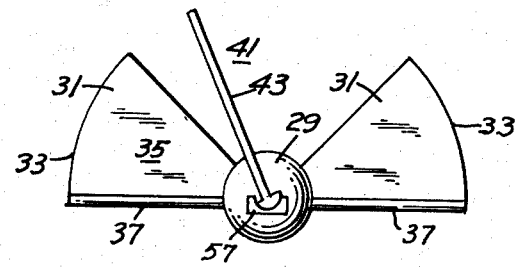
Figure 4 is an elevational view of the vanes in the meter of Figure 1.
Figure 5:
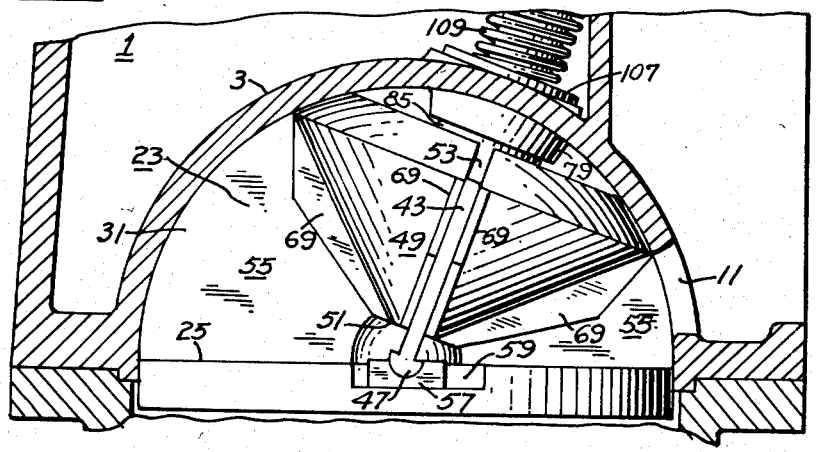
Figure 5 is a fragmentary view in section of the meter of Figure 1 and depicting a feature thereof.

Referring to the drawings for details of my invention in the preferred form illustrated therein, the same comprises a casing 1 involving an included hemi-spherical housing 3 enclosed within outer walls rising above said hemi-spherical housing, said casing being mounted on a base section 7. The hemi-spherical housing is provided with an inlet opening and a discharge opening 11, each having access with the outside through respective openings in the outer walls, all as depicted in my aforementioned patent.

The base section is of shallow concave interior with a circular rib 15 of substantial diameter within said interior, and an integral diametrical spanning member 17 carrying at its midpoint a shaft bearing 19.

The aforementioned circular rib is preferably recessed along its inner edge to provide a centering support for a ball bearing assembly 21 to act as a bearing support for the rotor 23 of the meter, and more particularly a circular rotatable base plate 25, forming an element of such rotor.

Such base plate carries a central stub shaft 27 of short length, which is journaled in the aforementioned bearing, and in its upper surface, the base plate is provided centrally thereof, with a part-spherical recess in which is disposed a metal ball 29.

In opposite directions from said ball there extends leaves 31 of substantially triangular shape, each terminating at the wall of the hemi-spherical chamber, in an arcuate edge 33 conforming to the curvature of said wall. Together with said ball, these leaves constitute a vane 35 of the meter under consideration. Leakage between the lower edge of each leaf and the base plate is reduced to a negligible minimum by providing an enlarged semi-cylindrical bead 37 along the lower edge of each leaf and fitting it into a complementary semi-cylindrical radial groove 39 in the base plate.

At substantially right angles to said vane is a second vane 41 formed of a second pair of similar leaves 43 joined by a bridge 45 extending over the ball, and conforming to the curvature thereof. Like the previous vane leaves, each leaf is provided with a lower semi-cylindrical beaded edge 47.

An inverted conical shaped rotor element 49 having a ball recess 51 at its apex for mounting said element for pivotal movement on said ball, is provided with a plurality of radial guide slots 53 to slidably receive the leaves of both said vanes and form therewith and said base plate, a plurality of meter compartments 55.

Such conical shaped rotor element is normally maintained at an angle to the circular base plate, in a meter of this type whereby during rotation of the rotor, each compartment will vary from a maximum volume at the location of the inlet opening to the hemi-spherical housing, to a minimum volume at the location of the discharge opening therefrom.

It is characteristic of this type of meter, that during such rotation of the rotor, not only does the angle of each vane with respect to the base plate vary cyclically in succession, but a fixed angle between the two vanes cannot be maintained as there is a tendency for such angle to vary slightly during a complete rotation of the rotor, and consequently provision must be made in such meter to permit of such characteristic movements of the vanes.

The semi-cylindrical beaded lower edge of each vane, when mounted in a corresponding groove, permits of the angular tilting movements of the vanes with respect to the circular base plate while maintaining a substantial seal along such edge, and, to permit of the necessary angular changes between vanes occurring during rotation of the rotor, it has been customary to provide a jib for each leaf of the second vane and dispose the same in a radial fan-shaped groove formed in the face of the base plate.

In the upper face of each such jib, there is provided a longitudinal semi-cylindrical groove to receive the lower edge of the associated leaf and by allowing limited freedom of movement of each jib in the plane of the base plate, the vane was free to shift to a degree necessary to permit rotational movement of the rotor in the meter.

In such prior meters, the liquid entering a rotor compartment brought pressure to bear against the contacted surface of the leaf of one of the vanes, such pressure in part being transmitted to the opposite leaf of the vane to cause such latter leaf to impart a driving force to the rotor. In the case of the second vane, the bridge represents the weakest portion of such vane and the transmission of such stress across the bridge to the opposite leaf of such vane results in straining of the vane at such point.

Provision is made in the meter of the present invention, for substantially sealing the lower edge of each of the second pair of leaves to the base plate while at the same time permitting not only the necessary tilting action thereof, but also the necessary limited sliding movement of the vane on the plane of the base plate and without unduly straining said vane along its weakest portion, namely the bridge, during operation of the meter.

Such means involves the provision of a jib 57 for each of the second pair of leaves, along the lines of the prior meter, that is each such jib being disposed in a radially directed fan-shaped groove 59 in the base plate, and having a longitudinal complementary groove 61 to receive the semi-cylindrical lower edge of the associated leaf of said second vane.

Transversely of each such fan-shaped groove, however, there is an arcuate opening 63 in the base plate, and through such opening, connection of the two jibs into a unitary assembly is effected. Such means of connection may take the form of a connecting bar 65 having at its midsection, an opening to pass the stub shaft, and terminating at each end in an arcuate segment 67. Such segments, each slidably fits in one of said transverse arcuate openings, and is riveted or otherwise affixed to its associated jib. By such an arrangement, the driving force of the liquid against one leaf of the vane, will be transmitted to the opposite leaf through the connecting arm which will then take the greater part of the strain and relieve the center or bridge portion of the vane of such stresses.

Each of the radial slots 53 of the conical shaped rotor element is bordered along each edge on the conical surface by a flange 69, each of said flanges extending from the ball recess and terminating short of the outer rim of the conical shaped rotor element, instead of reaching completely to the rim of such element as has been the prior practice.

In a meter of this type, complete discharge of all the liquid in a compartment is not realized, and a small amount of residual liquid is carried back to the starting point. By terminating the flanges in question at a point spaced from the outer rim of the conical shaped element, it has been found that a greater exposure of the discharge opening to the interior of the compartment facing such opening may be realized, with the result that a larger percentage of the liquid in such compartment will be discharged out of the meter, thereby improving its efficiency.

To support the conical shaped rotor element at an angle, the same is formed with a hub socket 71 into which is fitted a shaft 73 extending upwardly through an opening 75 in the hemispherical housing. This shaft is surrounded by a sleeve 77, one end of which terminates within the hemispherical housing where it is provided with a sealing flange 79 in contact with the interior surface of the hemi-spherical housing. The sleeve is precluded from turning by a pin 81 embedded in the housing wall and protruding into a groove 83 in the flange.

Between this flange 79 and the hub socket 71, there is disposed a thrust bearing 85 to take the thrust of the rotor in the direction of the shaft axis.

The angular position of the rotor is made adjustable by an adjustment control assembly 87, to alter the capacity of the meter in the interest of accuracy.

Such control involves an adjusting screw assembly comprising an adjusting screw 89 passing through a hole in a wall of the casing, such screw being surrounded by a packing gland to assure against leakage at this point.

This packing gland includes a cylindrical housing 91 having a flanged end 93 with the flange in contact with said wall, and seal material 95 in the housing about the adjusting screw. The seal material is held under compression by a compression spring 97 in the housing, which itself is maintained under compression by a closure 99 and locking means for such closure involving a lock washer 101 on the screw adjacent the closure and a nut 103 threaded tightly against said lock washer. A pin 105 through the nut and screw will assure against such nut accidentally working itself down on the thread to release the packing gland assembly from the pressure which such nut originally provided.

The adjusting screw is of a length sufficient to extend beyond the tightening nut, where it threads into the upturned end of a bracket arm 107 whose other end encircles the sleeve 77 so as to bring the rotor of the meter under control of the adjusting screw. A compression spring 109 surrounds the sleeve and holds the bracket in contact with the upper surface of the hemi-spherical housing.

A nut 111, welded to the upturned end of the bracket, will provide for an effective threading of the adjusting screw to such bracket. Rotation of such screw will accordingly tend to change the angular position of the rotor, the opening in the hemi-spherical housing through which the shaft passes, being made sufficiently large to accommodate such movements.

To assure that any adjusted position of the rotor shall remain fixed against accidental shift, it is essential that the adjusting mechanism be mechanically stressed. In the previous meters of this type, such stressing was accomplished through the incorporation of a compression spring between the bracket and the packing gland, but it has been found, that after a period of time, such springs have a tendency to fatigue and can no longer be relied on to maintain adjustment.

In the present embodiment of the invention, the compression spring is no longer relied on for this purpose, it being noted that the compression spring illustrated merely functions within the packing gland to maintain pressure on the packing or sealing material.

In the present device, the lock washer maintains sufficient stress on the adjusting screw to hold adjustments thereof so long as the nut is precluded from turning, which function is performed by the pin 105. The necessity for relying upon a coil spring for this purpose is thus avoided.

A scale 113 affixed to the flanged end of the packing gland housing will serve, when associated with a pointer or marker on the head of the adjusting screw, as an indication of the prevailing adjustment of the meter.

Rotational movements of the meter rotor are transmitted to a counter 115 mounted on the upper end of the meter casing, where such movements are registered. A spur gear 117 on the end of the rotor shaft engages a train of gears 119, the last gear of the train being affixed to the lower end of the counter shaft 121 which extends from the counter through a packing gland 123 into the meter casing. The spur gear being of sufficient thickness, any angular adjustment of the meter rotor within the permissible limits, will not disengage such spur gear from the gear train which transmits its movement to the counting mechanism, and consequently the driving engagement between the two will be maintained.

From the foregoing description of my invention in its preferred form, it will be apparent that the same fulfills all the objects attributable thereto, and while I have illustrated and described the same in considerable detail, I do not desire to be limited for protection to such details except as may be necessitated by the appended claims.

I claim:

1. In a liquid meter of the positive displacement type involving a hemi-spherical housing, a circular rotatably mounted base plate in said housing having a depending axial stub shaft, a ball centrally recessed in said base plate, and having oppositely directed leaves extending therefrom to the wall of said housing to constitute a vane of said meter, and a second pair of similar oppositely directed leaves at substantially right angles to said first pair and connected together by a bridge over said ball to constitute a second vane of said meter, said leaves having semi-cylindrical lower edges; means for substantially sealing said second vane to said base plate while at the same time permitting hinge action therewith, plus limited sliding movement in the plane of said base plate, without unduly straining said vane along its bridge during operation of said meter, said means comprising a jib for each of said second pair of leaves disposed in a radially directed fan-shaped groove in said base plate, each said jib having a longitudinal complementary groove in its upper surface to receive the semi-cylindrical edge of its associated leaf, and means connecting said jibs into a unitary assembly independently of said base plate, said last means including a connecting bar supported for movement relative to said base plate and having each of its ends connected to one of said jibs.

2. In a liquid meter of the positive displacement type involving a hemi-spherical housing, a circular rotatably mounted base plate in said housing having a depending axial stub shaft, a ball centrally recessed in said base plate and having oppositely directed leaves extending therefrom to the wall of said housing to constitute a vane of said meter, and a second pair of similar oppositely directed leaves at substantially right angles to said first pair and connected together by a bridge over said ball to constitute a second vane of said meter, said leaves having semi-cylindrical lower edges; means for substantially sealing said second vane to said base plate while at the same time permitting hinge action therewith, plus limited sliding movement in the plane of said base plate, without unduly straining said vane along its bridge during operation of said meter, said means comprising a jib for each of said second pair of leaves disposed in a radially directed fan-shaped groove in said base plate, each said jib having a longitudinal complementary groove in its upper surface to receive the semi-cylindrical edge of its associated leaf, said base plate having an arcuate opening transverse to each of said fan-shaped grooves, and means connecting said jibs into a unitary assembly, said last means including a connecting bar having at its mid-section, an opening for passing said stub shaft, and terminating at each end in an arcuate segment slidably fitting in one of said transverse arcuate openings, and means affixing each of said arcuate segments to its associated jib.

3. In a liquid meter of the positive displacement type involving a hemi-spherical housing, a circular rotatably mounted base plate in said housing, a ball centrally recessed in said base plate and having oppositely directed leaves extending therefrom to the wall of said housing to constitute a vane of said meter, and a second pair of similar oppositely directed leaves at substantially right angles to said first pair and connected together by a bridge over said ball to constitute a second vane of said meter, an inverted conical shaped rotor element having a ball recess at its apex for pivotally mounting said element on said ball, and a plurality of radial slots emanating from said ball recess and corresponding in number and position to said leaves, to slidably receive said leaves, and means supporting said rotor element on said ball at an angle to the vertical to form compartments of varying size, said housing having a discharge opening from the compartment of smallest size; flanges on said rotor element bordering said radial slots, each of said flanges terminating short of the rim of said conical shaped rotor element to expose the maximum area of said discharge opening to the contents of a registering compartment.

4. In a liquid meter of the positive displacement type, involving a hemi-spherical housing, a wall extending upwardly therefrom, a circular rotatably mounted base plate in said housing, a ball centrally recessed in said base plate and having oppositely directed leaves extending therefrom to the wall of said housing to constitute a vane of said meter, and a second pair of similar oppositely directed leaves at substantially right angles to said first pair and connected together by a bridge over said ball to constitute a second vane of said meter, an inverted conical shaped rotor element having a ball recess at its apex for pivotally mounting said element on said ball, and a plurality of radial slots emanating from said ball recess and corresponding in number and position to said leaves, to slidably receive said leaves; means for supporting said rotor element on said ball within a range of angular adjustments, said means including a shaft axially mounted at one end in said inverted conical shaped rotor element and extending through an enlarged opening in the upper portion of said hemi-spherical housing to permit limited swing of said shaft and rotor element on said ball, an adjustment screw assembly for adjusting the angular position of said shaft and rotor element within the permissible limits of said opening, said adjustment screw assembly comprising an adjusting screw passing through a hole in said upwardly extending wall, a packing gland mounted in said wall and surrounding said adjusting screw, said packing gland including a cylindrical housing having a flanged end with its flange in contact with said wall, seal material in said housing about said adjusting screw, a compression spring in said housing and means for maintaining said spring in pressure engagement with said seal material, said last means including a closure and locking means therefor involving a lock-washer on said screw adjacent said closure, a nut threaded tightly against said lock-washer and a pin through said nut and screw, and a bracket arm having one end threadedly engaged by said adjusting screw in a rigid adjustable connection and its other end encircling said shaft.

5. In a liquid meter of the positive displacement type, involving a hemi-spherical housing, a wall extending upwardly therefrom, a circular rotatably mounted base plate in said housing, a ball centrally recessed in said base plate and having oppositely directed leaves extending therefrom to the wall of said housing to constitute a vane of said meter, and a second pair of similar oppositely directed leaves at substantially right angles to said first pair and connected together by a bridge over said ball to constitute a second vane of said meter, an inverted conical shaped rotor element having a ball recess at its apex for pivotally mounting said element on said ball, and a plurality of radial slots emanating from said ball recess and corresponding in number and position to said leaves, to slidably receive said leaves; means for supporting said rotor element on said ball within a range of angular adjustments, said means including a shaft axially mounted at one end in said inverted conical shaped rotor element and extending through an enlarged opening in the upper portion of said hemi-spherical housing to permit limited swing of said shaft and rotor element on said ball, an adjustment screw assembly for adjusting the angular position of said shaft and rotor element within the permissible limits of said opening, said adjustment screw assembly comprising an adjusting screw passing through a hole in said upwardly extending wall, a packing gland mounted in said wall and surrounding said adjusting screw, said packing gland including a cylindrical housing having a flanged end with its flange in contact with said wall, seal material in said housing about said adjusting screw, a compression spring in said housing and means for maintaining said spring in pressure engagement with said seal material, said last means including a closure and locking means therefor involving a lock-washer on said screw adjacent said closure, a nut threaded tightly against said lock-washer and a pin through said nut and screw, and a bracket arm having an upturned end threadedly engaged on said adjusting screw in a rigid adjustable connection and its other end encircling said shaft.

References Cited in the file of this patent

UNITED STATES PATENTS

| Number | Name | Date |
|---|---|---|
| 2,101,428 | Cuny | Dec. 7, 1937 |
| 2,292,631 | Granberg | Aug. 11, 1942 |